United States Patent [19]

Kihara et al.

[11] Patent Number: 5,280,364
[45] Date of Patent: Jan. 18, 1994

[54] LINE IMAGE SENSOR AND FACSIMILE MACHINE INCLUDING THE SAME

[75] Inventors: Osamu Kihara; Seiji Koshikawa; Kensuke Sawase, all of Kyoto; Norimichi Teshiba, Amagi, all of Japan

[73] Assignee: Rohm Co., Ltd., Kyoto, Japan

[21] Appl. No.: 902,852

[22] Filed: Jun. 23, 1992

[30] Foreign Application Priority Data

Jun. 27, 1991 [JP] Japan ............................ 3-156367

[51] Int. Cl.$^5$ ............................................. H04N 1/04
[52] U.S. Cl. ..................................... 358/400; 358/471; 250/208.1
[58] Field of Search ............... 358/209, 305, 400, 401, 358/407, 471, 472, 473; 382/58, 65; 235/435, 439, 454; 250/208.1

[56] References Cited

U.S. PATENT DOCUMENTS

| | | | |
|---|---|---|---|
| 4,471,384 | 9/1984 | Sato et al. | 358/464 |
| 4,689,652 | 8/1987 | Shimada et al. | 257/443 |
| 4,707,615 | 11/1987 | Hosaka | 358/75 |
| 4,839,730 | 6/1989 | Shirakoshi et al. | 358/483 |
| 5,214,273 | 5/1993 | Yokochi | 250/208.1 |

*Primary Examiner*—Bentsu Ro

[57] ABSTRACT

A line image sensor capable of being constructed in a simple manner with reduced production steps at a low cost. The line image sensor includes a case body having a mount groove part in an appropriate part of a container chamber, and a LED array container case for containing a LED array, mounted to the case body within the container chamber. The LED array container case includes a mount part to be engaged with the mount groove part for mounting the LED array container case to the case body, a spring plate part for pushing and holding a condenser lens against an internal wall of the container chamber, and holding projection parts for pushing and holding the LED array within the LED array container case, and directs light generated by the LED array to a transparent glass plate for supporting a manuscript. A resilient member can be used in place of the spring plate part. A facsimile machine including the line image sensor is also disclosed.

20 Claims, 4 Drawing Sheets

LINE IMAGE SENSOR AND FACSIMILE MACHINE INCLUDING THE SAME

BACKGROUND OF THE INVENTION i) Field of the Invention:

The present invention relates to a line image sensor in which light emitted by an LED (light-emitting diode) array is reflected by the surface of a manuscript and the reflected light is concentrated by a condenser lens and is then detected by a light detector element array, and to a facsimile including the line image sensor.

ii) Description of the Related Arts:

In a conventional line image sensor, light emitted by an LED array composed of a plurality of light emitter elements such as LEDs particularly arranged is irradiated to the predetermined range of a manuscript and the light reflected by the manuscript is concentrated by a condenser lens and is then detected by a light detector element array composed of a plurality of light detector elements particularly arranged. Hence, the light detector element array reads image data of the manuscript to output electric signals as the image data. By the reading of each line in succession, the image data of the entire manuscript are read into the line image sensor. Such a line image sensor is frequently used for an image reading part of an image processing apparatus such as a facsimile machine or the like.

In FIG. 1, there is shown a conventional line image sensor. As shown in FIG. 1, in the line image sensor, a transparent glass plate 13 for supporting a manuscript is mounted on the top of a container chamber 12 of a case body 11. Within the case body 11, a reflection case 14, an LED array 15 with light emitting elements 15a, mounted to the reflection case 14, a condenser lens 16 such as a selfoc lens mounted to an internal wall of the container chamber 12, and a light detector element array 17 are arranged.

When the light emitting elements 15a of the LED array 15 generate the light, the light is reflected by a transparent resin film such as a silicon resin film of the reflection case 14 and is irradiated to the transparent glass plate 13. The manuscript is placed on the transparent glass plate 13, and the light is reflected by the manuscript supported on the transparent glass plate 13. Then, the reflected light is concentrated by the condenser lens 16, and concentrated light is detected by the light detector element array 17.

In the conventional line image sensor, the reflection case 14 and the LED array 15 are separately formed from each other. Hence, when the line image sensor is constructed, the reflection case 14 and the LED array 15 must be integrally assembled. In this assembling work, some processing is required to the LED array 15 side. Next, the LED array 15 providing with the reflection case 14 is secured to a mounting surface of the case body 11 by using a double-coated adhesive tape 18. The condenser lens 16 is fixed to the internal surface of the container chamber 12 by using a screw 19 while the condenser lens 16 is pressed to the internal surface of the container chamber 12. Thus, in addition to the assembling work of the reflection case 14 and the LED array 15, the LED array 15 must be mounted to the case body 11 by using the double-coated adhesive tape 18 and further the condenser lens 16 must be fixed to the container chamber 12 by using the screw 19. Hence, in the construction of the line image sensor, there are many parts and many assembly steps and thus the cost of the product is largely increased.

SUMMARY OF THE INVENTION

It is therefore an object of the present invention to provide a line image sensor in view of the aforementioned problems of the prior art, which is capable of being constructed in a simple manner at a low cost and reducing the number of steps in the construction process.

It is another object of the present invention to provide a facsimile machine including a line image sensor which is capable of being constructed in a simple manner at a low cost and reducing the number of steps in the construction process.

In accordance with one aspect of the present invention, there is provided a line image sensor for reading an image of a manuscript, comprising: an LED array having a plurality of LEDs aligned along and near to an image reading line for irradiating light to the manuscript; a condenser lens arranged near the image reading line for concentrating the light reflected by the manuscript; a light detector element array having a plurality of light detector elements aligned along and near to the image reading line for detecting the light concentrated by the condenser lens; an LED array container case arranged near the image reading line for containing the LED array and directing the light generated by the LED array to the manuscript; and a case body having a container chamber for containing at least the LED array container case, the condenser lens and the light detector element array, and a mount groove for mounting the LED array container case in a proper position of the container chamber, the LED array container case including: a spring plate part for pushing and holding the condenser lens against an internal wall of the container chamber and pushing and holding the LED array container case against the internal wall of the container chamber by a counteraction of the spring plate part; a mount part for mounting the LED array container case onto the internal wall of the container chamber by engaging with the mount groove of the case body; and a holding member part for pushing and holding the LED array contained in the LED array container case.

In accordance with another aspect of the present invention, there is provided a line image sensor for reading an image of a manuscript, comprising: an LED array having a plurality of LEDs aligned along and near to an image reading line for irradiating light to the manuscript; a condenser lens arranged near the image reading line for concentrating the light reflected by the manuscript; a light detector element array having a plurality of light detector elements aligned along and near to the image reading line for detecting the light concentrated by the condenser lens; an LED array container case arranged near the image reading line for containing the LED array and directing the light generated by the LED array to the manuscript; a case body having a container chamber for containing at least the LED array container case, the condenser lens and the light detector element array, and a mount groove for mounting the LED array container case in a proper position of the container chamber; and a resilient member inserted between the condenser lens and the LED array container case for pushing and holding the condenser lens and the LED array container case against an internal wall of the container chamber, the LED array container case including: a mount part for mounting the LED array container case onto the internal wall of the container chamber by engaging with the mount groove of the case body; and a holding member part for pushing and holding the LED array contained in the LED array container case.

In the line image sensor having the above-described construction, the LED array container case and the LED array are formed into one unit. Further, when the LED array container case is mounted to the case body, the LED array container case can also mount the condenser lens to the case body. That is, when the LED array is inserted into the LED array container case, holding projection parts push and hold the LED array to integrate the LED array container case and the LED array. Further, the mount part is provided on one end of a flat bottom plate part of the LED array container case and is detachably fitted into a mount groove of the LED array container case so as to temporarily mount the LED array container case onto the case body. Further, the spring plate part is formed to one vertical side part of the LED array container case and pushes and holds the condenser lens against the internal wall of the container chamber in the temporary mounting state of the LED array container case onto the case body. At the same time, by a counteraction of the spring plate part, the mount part is strongly fitted in the mount groove so as to push and hold the LED array container case against the case body. Further, a resilient member can be inserted in place of the spring plate part between the condenser lens and the LED array container case with the same effects as those obtained by using the spring plate part. Further, by providing reflection plates on both side end surfaces of a light path of the LED array container case by means of vapor deposition of aluminum or the like, the luminance of the LED array can be made uniform.

Hence, according to the present invention, by using the LED array container case, the LED array and the condenser lens can be mounted to the case body in an extremely simple manner and thus a cost reduction of the product can be achieved.

In accordance with still another aspect of the present invention, there is provided a facsimile machine including the line image sensor having the above-described construction.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
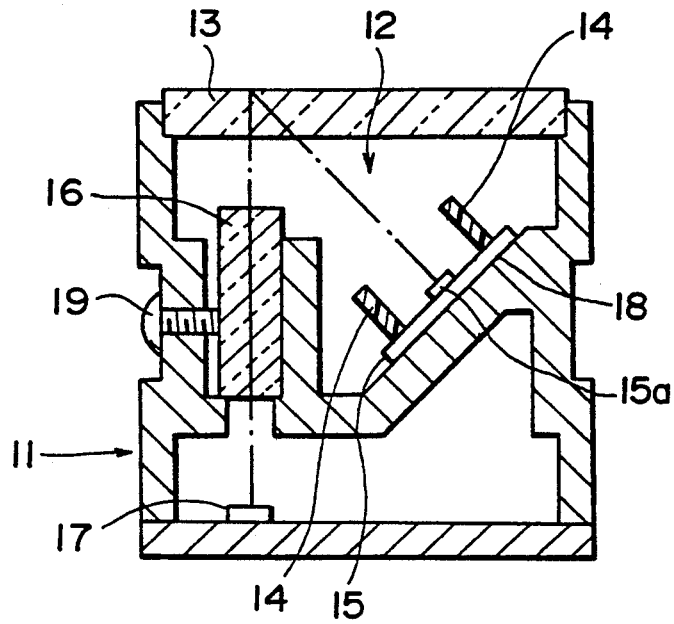
FIG. 1 is a longitudinal cross sectional view of a conventional line image sensor.
Figure 2:
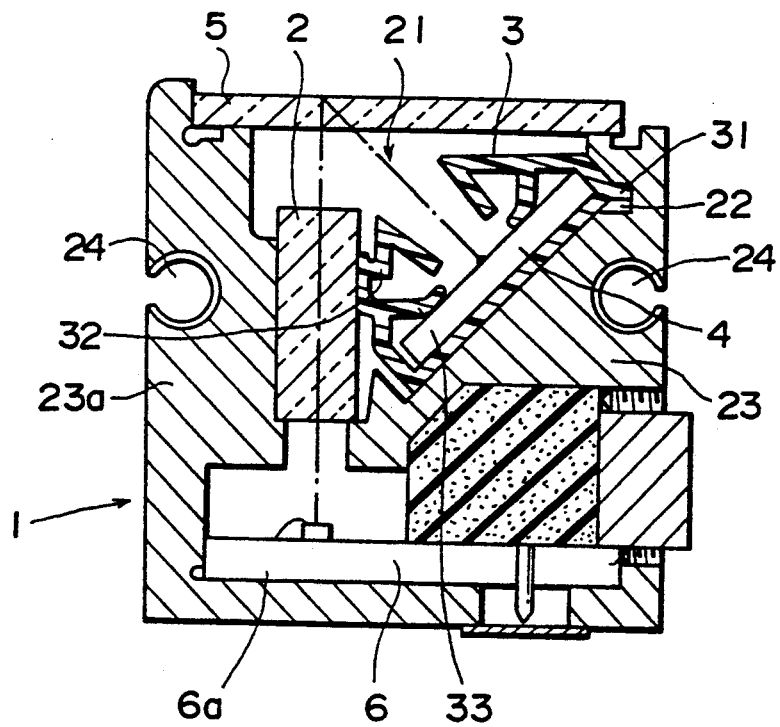
FIG. 2 is a longitudinal cross sectional view of one embodiment of a line image sensor according to the present invention.

Referring now to the drawings, wherein like reference characters designate like or corresponding parts throughout the views and thus the repeated description thereof can be omitted for brevity, there is shown in FIG. 2 one embodiment of a line image sensor according to the present invention.

As shown in FIG. 2, the line image sensor includes a case body 1 having a container chamber 21 in the upper part and an LED array container case 3 for containing an LED array 4. The case body 1 having a rectangular parallele-piped form includes first and second frames 23 and 23a for defining the container chamber 21 and a mount groove part 22 in an appropriate portion of the first frame 23, the first and second frames 23 and 23a locating on the opposite sides. The LED array container case 3 includes a mount part 31 to be fitted into the mount groove part 22 of the case body 1, a spring plate part 32 for pushing and holding a condenser lens 2 to be pushed onto an internal surface of the second frame 23a in the container chamber 21, and a pair of holding projection parts 33 for pushing and holding the LED array 4 contained within the LED array container case 3. The LED array container case 3 is mounted to the case body 1 in the container chamber 21 by fitting the mount part 31 of the LED array container case 3 into the mount groove part 22 of the case body 1. A transparent glass plate 5 for supporting a manuscript is mounted on the top of the container chamber 21 or the case body 1. The light generated by the LED array 4 held in the LED array container case 3 is irradiated to the transparent glass plate 5. The case body 1 also includes a light detector element array 6 having a plurality of light detector elements 6a such as photo transistors or the like on the bottom in the lower part of the container chamber 21. In the case body 1, the first and second frames 23 and 23a are formed with holes for mounting the case body 1 to an apparatus body such as a facsimile machine or the like in the appropriate portions of the external surfaces.

Figure 3:
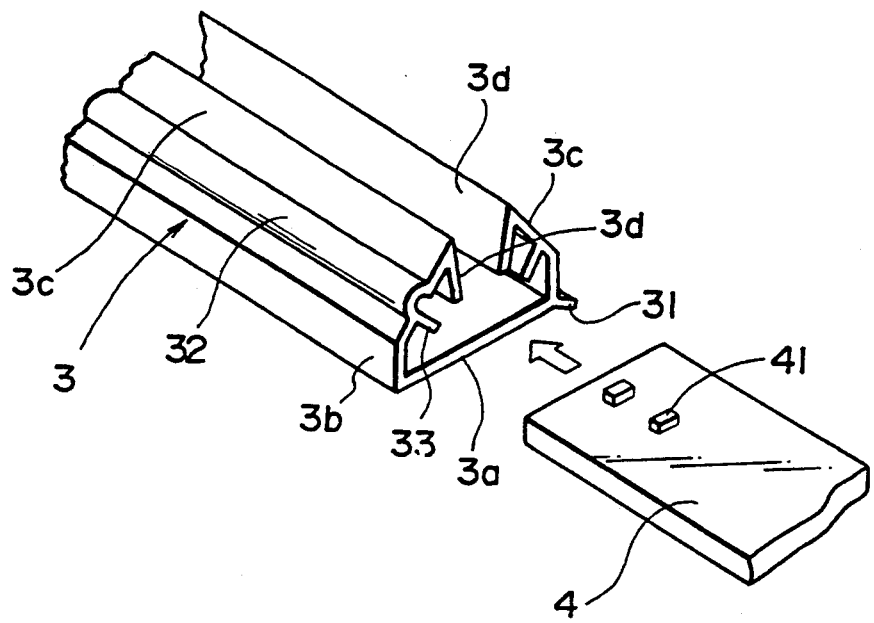
FIG. 3 is a fragmentary exploded perspective view of an LED array container case and an LED array used for the line image sensor shown in FIG. 2.

FIG. 3 illustrates the LED array container case 3 to be formed by, for example, an extrusion molding machine. The LED array container case 3 includes a flat bottom plate part 3a, a pair of vertical side parts 3b perpendicularly connected to both ends of the flat bottom plate part 3a, a pair of slanted upper parts 3c which are inclined inwards and are connected to the upper ends of the vertical side parts 3b, and a pair of light path parts 3d vertically connected to the internal upper ends of the slanted upper parts 3c. The light path parts 3d reflect the spreading light emitted by the LED array 4 so as to lead the light towards the irradiation surface of the transparent glass plate 5. Further, the holding projection parts 33 slantingly projects towards the flat bottom plate part 3a from the middle portions of the slanted upper parts 3c, and the spring plate part 32 projects outwards from the middle part of one slanted upper part 3c. The mount part 31 to be detachably fitted into the mount groove part 22 of the first frame 23 projects outwards from the lower end of the flat bottom plate part 3a which is on the opposite side to the spring plate part 32 of the slanted upper part 3c.

The LED array 4 having a plurality of LED chips 41 mounted on its internal surface by die bonding and wire bonding is removably fitted and held in the LED array container case 3.

Further, although the luminance of the LED array 4 contained in the LED array container case 3 is compensated for by the composite light of the LED chips 41 adjacent to each other, in the end parts of the LED array 4, the composite light may become weak and thus the luminance can be lowered compared with the central part.

Figure 4:
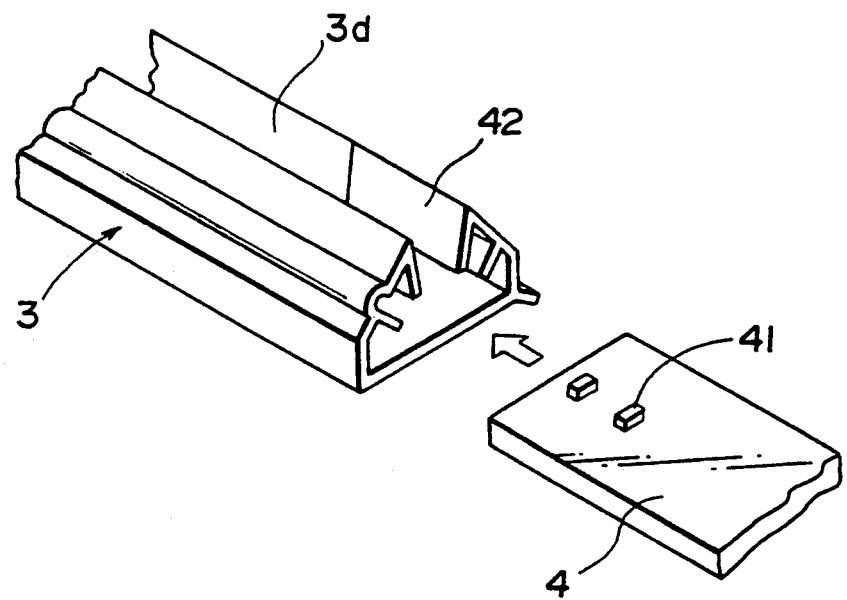
FIG. 4 is a fragmentary exploded perspective view of an LED array container case having a reflection plate and an LED array used for the line image sensor shown in FIG. 2.

In order to remove this problem, as shown in FIG. 4, the LED array container case 3 is formed with four reflection plates 42 having higher reflection efficiency than the light path parts 3d in both the side ends of the light path parts 3d so as to effectively reflect the spreading light of the LED chips 41. As a result, the reduction of the luminance in both the ends of the light path parts 3d is compensated for and the uniform light generation of the LED array 4 can be obtained.

The reflection plates 42, for instance, can be formed by a vapor deposition of aluminum on a plastic plate or by attaching a silver-metallic material coated paper, an aluminum coated tape or the like on the plastic plate with the same effect.

Figure 5:
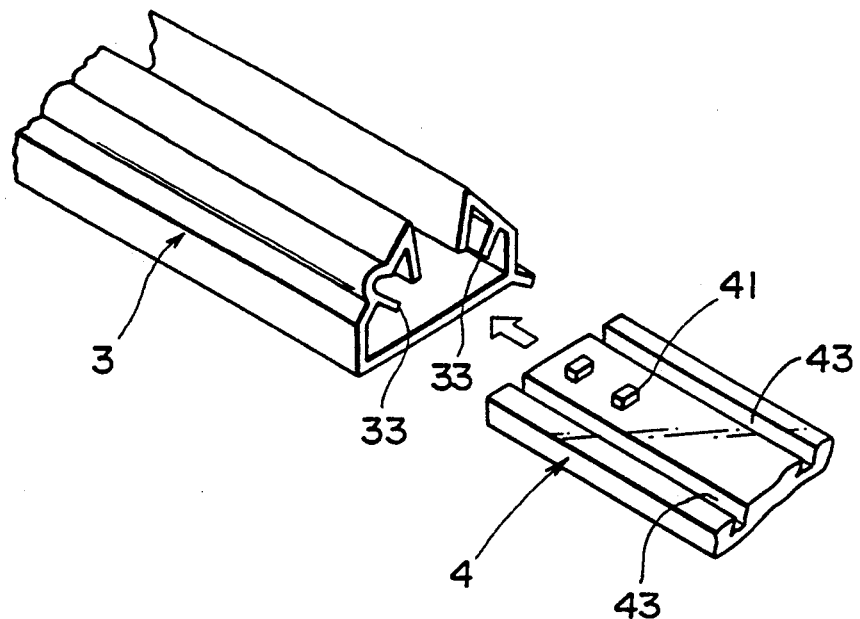
FIG. 5 is a fragmentary exploded perspective view of an LED array container case and an LED array having positioning grooves used for the line image sensor shown in FIG. 2.

Further, as shown in FIG. 5, by providing positioning grooves 43 to be engaged with the tips of the holding projection parts 33 on the surface of the LED array 4, the mounting or holding of the LED array 4 on or in the LED array 4 can be readily performed.

In the above-described line image sensor, the assembly operation is carried out as follows. That is, first, the LED array 4 is inserted into the LED array container case 3, that is, the part formed by the flat bottom plate part 3a and the vertical side parts 3b, through one of its end openings. At this time, the LED array 4 is pressed against the flat bottom plate part 3a by the pair of holding projection parts 33 and is held in contact with the flat bottom plate part 3a. In this state, the LED chips 41 are surrounded by the opposite light path parts 3d constituting a predetermined light path. The LED array container case 3 containing the LED array 4 is inserted into the container chamber 21 through an upper opening part and is mounted in the case body 1 in the predetermined position by fitting the mount part 31 of the LED array container case 3 into the mount groove part 22 formed in the first frame 23 of the case body 1. In this state, the LED array container case 3 is temporarily fixed in the container chamber 21.

Next, the condenser lens 2 is inserted into the container chamber 21 from the top and is positioned in the predetermined location between the second frame 23a and the spring plate part 32 of the LED array container case 3. In this case, the condenser lens 2 is strongly mounted to the second frame 23a by means of the pushing of the spring plate part 32 and at the same time, the mount part 31 is also strongly pushed into the mount groove part 22 of the first frame 23 by the counteraction of the spring plate part 32. As a result, the LED array container case 3 can be perfectly mounted to the case body 1 within the container chamber 21.

Hence, in this embodiment, using only the LED array container case 3, the LED array 4 and the condenser lens 2 can be mounted to the case body 1 in an extremely simple manner. Further, at the assembly stage, the number of parts is extremely small and the number of steps is also largely reduced to achieve a cost reduction of a product.

Figure 6:
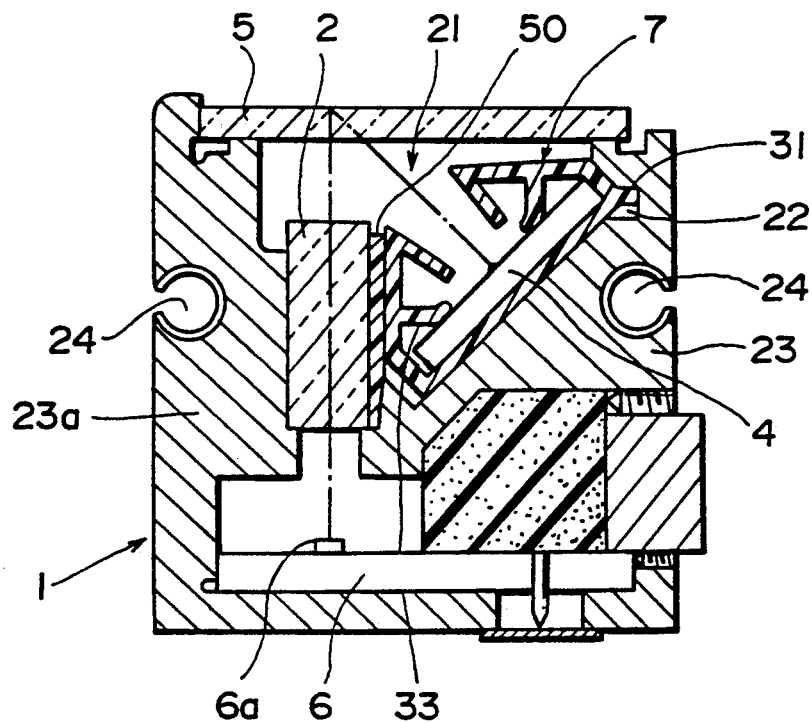
FIG. 6 is a longitudinal cross sectional view of another embodiment of a line image sensor according to the present invention.

In FIG. 6, there is shown another embodiment of a line image sensor according to the present invention. This line image sensor having the same construction as the first embodiment shown in FIG. 2, except that an LED array container case 7A is not formed with a spring plate part on a slanted upper parts 3c and a resilient member 50 is inserted between the condenser lens 2 and the slanted upper parts of the LED array container case 7A. This line image sensor attending the same effects as those obtained in the first embodiment described above. In this embodiment, for example, the material of the resilient member 50 is sponge, soft rubber or the like.

Figure 7:
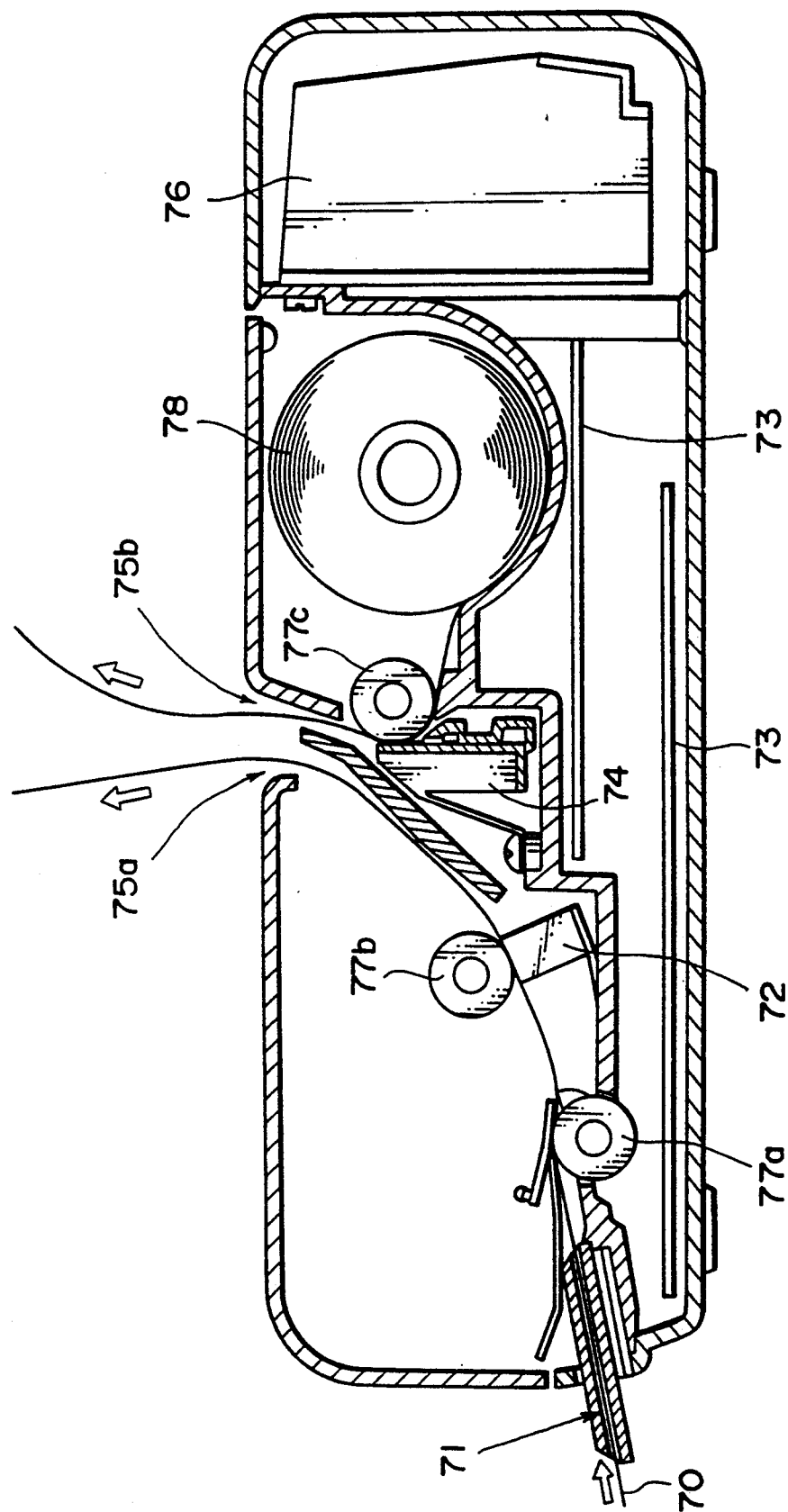
FIG. 7 is a longitudinal cross sectional view of a facsimile machine including a line image sensor according to the present invention.

In FIG. 7, there is shown a facsimile machine including a line image sensor having the above-described construction according to the present invention.

The facsimile machine includes a manuscript supply part 71, an image reading part 72 comprised of the line image sensor, a control part 73 for controlling the transmitting and receiving and the whole of the facsimile machine, a printing part 74, a manuscript discharge part 75 and a power supply 76.

The operation of the facsimile machine will now be described. First, when a manuscript 70 is supplied to the manuscript supply part 71, the manuscript 70 is transferred by platen rollers 77a and 77b. At this time, an image of the manuscript 70 is read by the line image sensor of the image reading part 72 and image data of the manuscript 70 are output as electric signals to the control part 73. The control part 73 transmits the signals to an external part via a telephone line or the like. The manuscript 70 is discharged out of the manuscript discharge part 75a when the image has finished being read. Further, when the control part 73 receives the signals sent from the external part, the control part 73 controls the printing part 74 to allow the printing part 74 to print the sent image on printing paper 78, and the printed paper 78 is discharged out of the manuscript discharge part 75b by a platen roller 77c.

As described above, by mounting the line image sensor according to the present invention in such a facsimile machine, the number of steps in the construction of the facsimile machine can be largely reduced, and thus the cost of the product can be lowered.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A line image sensor for reading an image of a manuscript, comprising:
   an LED array having a plurality of LEDs aligned along and near an image reading line for irradiating light to the manuscript;
   a condenser lens arranged near the image reading line for concentrating the light reflected by the manuscript;
   a light detector element array having a plurality of light detector elements aligned along and near the image reading line for detecting the light concentrated by the condenser lens;
   an LED array container case arranged near the image reading line for containing the LED array and directing the light generated by the LED array to the manuscript; and a case body having a container chamber for containing at least the LED array container case, the condenser lens and the light detector element array, and a mount groove for mounting the LED array container case in an appropriate position of the container chamber, the LED array container case including:

a spring plate part for pushing and holding the condenser lens against an internal wall of the container chamber and pushing and holding the LED array container case against the internal wall of the container chamber by a counteraction of the spring plate part;

a mount part for mounting the LED array container case onto the internal wall of the container chamber by engaging with the mount groove of the case body; and a holding member part for pushing and holding the LED array contained in the LED array container case.

2. The line image sensor of claim 1, wherein the LED array container case includes a light path with side surfaces and reflection plates attached to both ends of the side surfaces.

3. The line image sensor of claim 2, wherein each reflection plate is formed by a vapor deposition of aluminum onto a plastic plate.

4. The line image sensor of claim 1, wherein the LED array container case is formed by an extrusion molding of a resin.

5. The line image sensor of claim 1, wherein the LED array includes a positioning groove.

6. A facsimile machine for reading an image of a manuscript, comprising:

an LED array having a plurality of LEDs aligned along and near an image reading line for irradiating light to the manuscript;

a condenser lens arranged near the image reading line for concentrating the light reflected by the manuscript;

a light detector element array having a plurality of light detector elements aligned along and near the image reading line for detecting the light concentrated by the condenser lens;

an LED array container case arranged near the image reading line for containing the LED array and leading the light generated by the LED array to the manuscript; and a case body having a container chamber for containing at least the LED array container case, the condenser lens and the light detector element array, and a mount groove for mounting the LED array container case in an appropriate position of the container chamber.

the LED array container case including:

a spring plate part for pushing and holding the condenser lens against an internal wall of the container chamber and pushing and holding the LED array container case against internal wall of the container chamber by a counteraction of the spring plate part;

a mount part for mounting the LED array container case onto the internal wall of the container chamber by engaging with the mount groove of the case body; and a holding member part for pushing and holding the LED array contained in the LED array container case.

7. The facsimile machine of claim 6, wherein the LED array container case includes a light path with side surfaces and reflection plates attached to both ends of the side surfaces.

8. The facsimile machine of claim 7, wherein each reflection plate is formed by a vapor deposition of aluminum onto a plastic plate.

9. The facsimile machine of claim 6, wherein the LED array container case is formed by an extrusion molding of a resin.

10. The facsimile machine of claim 6, wherein the LED array includes a positioning groove.

11. A line image sensor for reading an image of a manuscript, comprising:

an LED array having a plurality of LEDs aligned along and near an image reading line for irradiating light to the manuscript;

a condenser lens arranged near the image reading line for concentrating the light reflected by the manuscript;

a light detector element array having a plurality of light detector elements aligned along and near the image reading line for detecting the light concentrated by the condenser lens;

an LED array container case arranged near the image reading line for containing the LED array and directing the light generated by the LED array to the manuscript;

a case body having a container chamber for containing at least the LED array container case, the condenser lens and the light detector element array, and a mount groove for mounting the LED array container case in an appropriate position of the container chamber; and a resilient member inserted between the condenser lens and the LED array container case for pushing and holding the condenser lens and the LED array container case against an internal wall of the container chamber, the LED array container case including:

a mount part for mounting the LED array container case onto the internal wall of the container chamber by engaging with the mount groove of the case body; and a holding member part for pushing and holding the LED array contained in the LED array container case.

12. The line image sensor of claim 11, wherein the LED array container case includes a light path with side surfaces and reflection plates attached to both ends of the side surfaces.

13. The line image sensor of claim 12, wherein each reflection plate is formed by a vapor deposition of aluminum onto a plastic plate.

14. The line image sensor of claim 11, wherein the LED array container case is formed by an extrusion molding of a resin.

15. The line image sensor of claim 11, wherein the LED array includes a positioning groove.

16. A facsimile machine for reading an image of a manuscript, comprising:

an LED array having a plurality of LEDs aligned along and near an image reading line for irradiating light to the manuscript;

a condenser lens arranged near the image reading line for concentrating the light reflected by the manuscript;

a light detector element array having a plurality of light detector elements aligned along and near the image reading line for detecting the light concentrated by the condenser lens;

an LED array container case arranged near the image reading line for containing the LED array and directing the light generated by the LED array to the manuscript;

a case body having a container chamber for containing at least the LED array container case, the condenser lens and the light detector element array, and a mount groove for mounting the LED array container case in an appropriate position of the container chamber; and a resilient member inserted between the condenser lens and the LED array container case for pushing and holding the condenser lens and the LED array container case against an internal wall of the container chamber, the LED array container case including:

a mount part for mounting the LED array container case onto the internal wall of the container chamber by engaging with the mount groove of the case body; and a holding member part for pushing and holding the LED array contained in the LED array container case.

17. The facsimile machine of claim 16, wherein the LED array container case includes a light path with side surfaces and reflection plates attached to both ends of the side surfaces.

18. The facsimile machine of claim 17, wherein each reflection plate is formed by a vapor deposition of aluminum onto a plastic plate.

19. The facsimile machine of claim 16, wherein the LED array container case is formed by an extrusion molding of a resin.

20. The facsimile machine of claim 16, wherein the LED array includes a positioning groove.

* * * * *